(12) United States Patent
Matus et al.

(10) Patent No.: US 8,754,767 B2
(45) Date of Patent: Jun. 17, 2014

(54) GEOGRAPHIC LOCALIZATION SYSTEM

(75) Inventors: José Adalberto Terán Matus, Nuevo León (MX); Rafael Guillermo Ramos Elizondo, Monterrey (MX)

(73) Assignee: RFID Mexico, S.A. de C.V., Nuevo Leon (MX)

( * ) Notice: Subject to any disclaimer, the term of this patent is extended or adjusted under 35 U.S.C. 154(b) by 718 days.

(21) Appl. No.: 12/898,860

(22) Filed: Oct. 6, 2010

(65) Prior Publication Data

US 2011/0140849 A1    Jun. 16, 2011

Related U.S. Application Data

(60) Provisional application No. 61/249,016, filed on Oct. 6, 2009.

(51) Int. Cl.
G01S 19/48        (2010.01)

(52) U.S. Cl.
USPC .............. 340/539.13; 340/8.1; 455/456.1; 455/456.5; 455/456.6; 342/357.31; 342/450

(58) Field of Classification Search
CPC ......... G01S 19/48; G01S 19/42; G01S 19/45; G01S 19/46; G01S 19/51; G01S 5/02; G01S 15/0257; G01S 5/0263

USPC ............... 340/539.13, 8.1; 455/456.1–456.4, 455/456.5–456.6; 342/357.31, 450
See application file for complete search history.

(56) References Cited

U.S. PATENT DOCUMENTS

| | | | |
|---|---|---|---|
| 5,809,234 A * | 9/1998 | Le Van Suu | 709/230 |
| 6,380,890 B1 * | 4/2002 | Smith et al. | 342/357.31 |
| 6,768,909 B1 * | 7/2004 | Irvin | 455/456.1 |
| 7,764,231 B1 * | 7/2010 | Karr et al. | 342/457 |
| 2005/0037775 A1 * | 2/2005 | Moeglein et al. | 455/456.1 |
| 2006/0243120 A1 * | 11/2006 | Takai et al. | 84/612 |
| 2007/0069946 A1 * | 3/2007 | Kaplan et al. | 342/357.09 |
| 2007/0109184 A1 * | 5/2007 | Shyr et al. | 342/357.06 |
| 2008/0139219 A1 * | 6/2008 | Boeiro et al. | 455/456.2 |
| 2009/0073030 A1 * | 3/2009 | Hansen et al. | 342/357.1 |
| 2009/0192709 A1 * | 7/2009 | Yonker et al. | 701/215 |
| 2009/0196267 A1 * | 8/2009 | Walker, Sr. | 370/338 |
| 2009/0303121 A1 * | 12/2009 | Alizadeh-Shabdiz | 342/357.09 |
| 2010/0052983 A1 * | 3/2010 | Alizadeh-Shabdiz | 342/357.09 |
| 2010/0283676 A1 * | 11/2010 | Hatami et al. | 342/357.31 |

* cited by examiner

*Primary Examiner* — Andrew Bee
(74) *Attorney, Agent, or Firm* — Young & Thompson

(57) ABSTRACT

A geographic localization system and method, which is able to accurately calculate its current location anywhere in the world based on the processing of information received from at least one of several wireless sources available at the moment, such as WiFi, Bluetooth, etc and from available positioning means such as GPS.

18 Claims, 1 Drawing Sheet

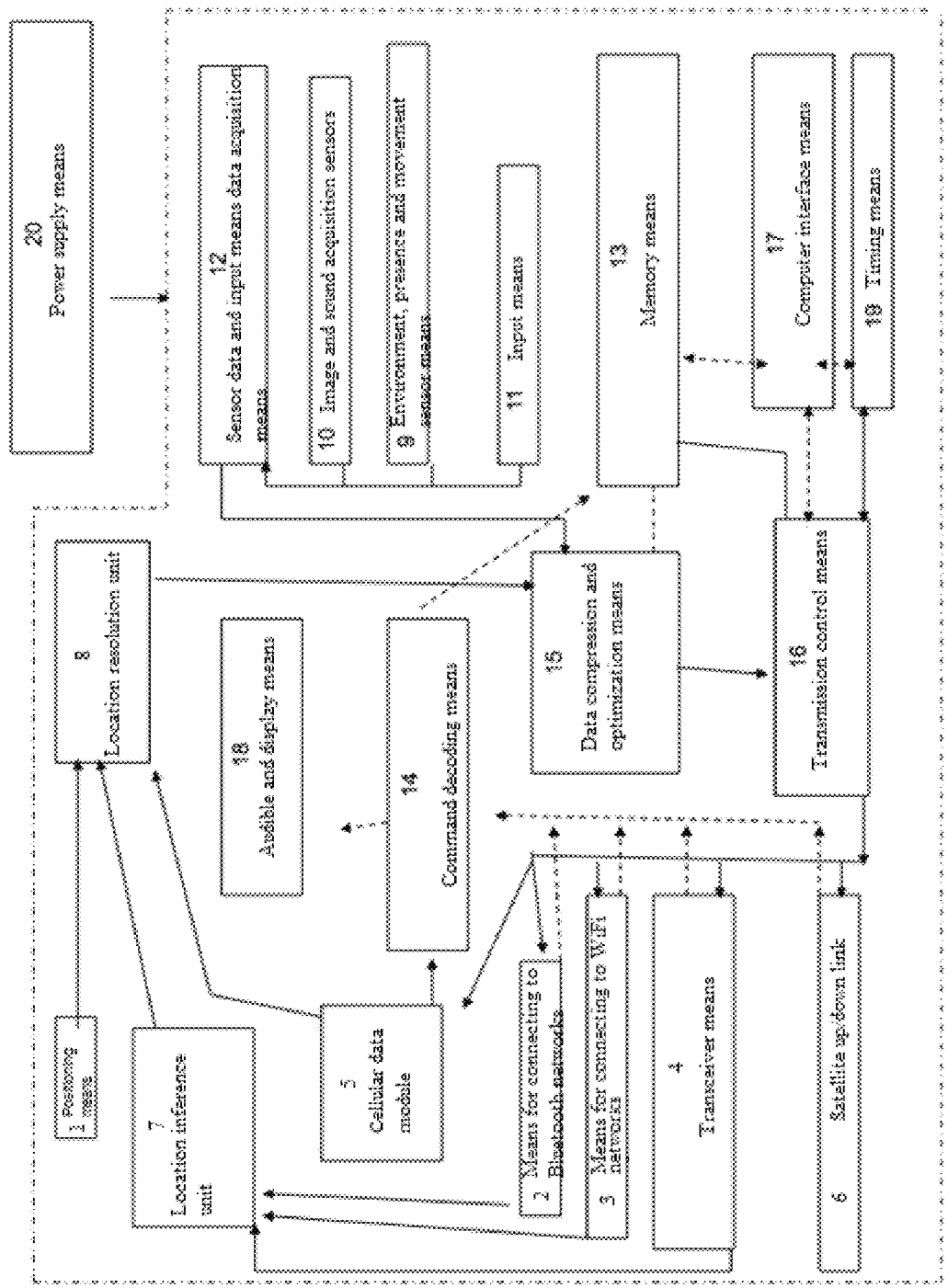

GEOGRAPHIC LOCALIZATION SYSTEM

BACKGROUND OF INVENTION

A. Field of the Invention

The present invention is related to devices and systems for locating person and objects worldwide, and more particularly to a geographic localization system and method which is able to calculate its location based on the processing information received from at least one of a plurality of wireless data channels such as WiFi, Bluetooth, etc and from positioning means such as GPS depending on their availability at the moment of calculating the position of the system.

B. Description of the Related Art

There are well known the devices and systems for locating persons and assets based on GPS, and other similar satellite based location technologies.

There are also known systems and methods which make use of wireless data channels available (such as WiFi and Bluetooth) in order to calculate the position of the device.

However, such devices often miscalculates its position since they are only able to use the information provided by only one data channel in order to calculate its position, and switch from one wireless data channel to other data channels in accordance with their availability in its current location.

In view of the above referred problems, applicant developed a geographic localization system and a related method which is able to accurately calculate its current location anywhere in the world (not only inside a predetermined geographic region or location such as inside a warehouse, etc.) based on the processing of information received from at least one of several wireless sources available at the moment, such as WiFi, Bluetooth, etc and from positioning means such as GPS.

SUMMARY OF THE INVENTION

It is therefore a main object of the present invention to provide a geographic localization system and method which is able to accurately calculate its current location anywhere in the world It is another object of the present invention, to provide a geographic localization system and method of the above disclosed nature, which is able to accurately calculate its current location anywhere in the world based on the processing of information received from at least one of several wireless sources available at the moment, such as WiFi, Bluetooth, etc and from available positioning means such as GPS.

These and other objects and advantages of the geographic localization system of the present invention will become apparent to those persons having an ordinary skill in the art, from the following detailed description of the embodiments of the invention, which will be made with reference to the accompanying drawing.

BRIEF DESCRIPTION OF THE DRAWINGS

FIG. 1 is a diagram of the geographic localization system of the present invention.

DETAILED DESCRIPTION OF THE INVENTION

The invention will be described in accordance with a preferred embodiment thereof and making reference to the accompanying drawings, wherein the geographic localization system of the present invention comprising:

positioning means 1 comprising a global positioning system (GPS), receiving information (input) from dedicated satellites and calculating the approximate position of the geographic positioning system; calculating speed, altitude and bearing of the positioning means and providing timing information (output).

means for connecting to data channels such as:
means for connecting to Bluetooth networks 2;
means for connecting to WiFi networks (WiFi (802.11b/g/a/n) 3;
transceiver means comprising a transceiver module such as zigbee, ASK/OOK or proprietary 4;
means for connecting to cellular networks comprising a cellular data module 5, said means for connecting to a cellular network capable of calculate an approximate location coordinate based on proprietary algorithms using the data signal, timing and other characteristics intrinsic to each particular network which are processed in the module to be available to the geographic positioning device; and
means for connecting to a satellite or to satellite networks comprising a satellite up/down link 6 for sending and receiving information to and from a satellite or network of satellites, such as Inmarsat, to allow concentration of information on a main server as well as propagating information from a server connected to the geographic localization system to other devices around the world;

location inference means, comprising a location inference unit 7, receiving information from the means for connecting to Bluetooth networks, from the means for connecting to WiFi networks and from the transceiver module, about communication links (input) such as signal intensity, transmission time of fly, transmission time differential, and inferring an approximate location (output) of the geographic positioning device by using several parameters of the information about said communication links, such as signal intensity, signal difference between bases, frequency shift, time difference between signals received, time of flight for a data packet. The approximate location is calculated by using said parameters in order to locate the nearest base satiation and if the parameters of said communication with the nearest communication base station are within a predetermined range, the location inference means assumes that the geographic localization system is within a position (an approximate location). The location inference means may also include means for further increasing the accuracy of said approximate location, comprising a deduction algorithm processed by the location inference means;

location resolution means comprising a location resolution unit 8, receiving pre-processed location information (input) from several sources such as: the positioning means, the location inference means, or from means for connecting to a cellular network, and processing said location information for obtaining the a best possible location coordinate (output) from said sources. The location resolution means may additionally interpolate or include hysteresis by merging all the different pre-processed location information sources. The location resolution means are very important for the Geographic localization system, since every pre-processed location information source have different accuracies and weaknesses depending on the environment.

sensors for acquiring data from the environment of the geographic localization system, such as:
environment, presence and movement sensor means 9, such as a temperature sensor, presence sensor, movement sensor and pressure sensor, for providing information (sensor data) about the environmental conditions and about the presence or absence of objects or persons at a current location, to the geographic localization system;

image and sound acquisition sensors 10 such as a camera and a microphone (or any other image or sound sensing device) of the type that can be integrated in a chip (cmos, ccd, others) to provide a visual representation and to capture the actual audio of the ambiance of the current location;

input means 11 such as one or more buttons or a keypad for allowing a user to interact with the geographic localization system and initiate or change the status of the device, such as requesting device status, request sensor information etc;

sensor data and input means data acquisition means 12, comprising a sensor data acquisition unit for gathering data from the environment, presence and movement sensor means, from the image and sound acquisition sensors, and from the input means, said sensor data acquisition unit comprising a set of ADC (analog to digital converters), samplers and internal and external communication channels for gathering data from said environment, presence and movement sensor means;

memory means 13, such as an internal or removable memory for storing information such as sensor data, input means data from the input means, approximate location data from the location inference means, best possible location coordinate from the location resolution means, transmission parameters used by transmission control means (which will be described later), timing information produced by timing means (which will be described later), for later processing by the location inference means, by data compression and optimization means (which will be described later) and by transmission control means (which will be described later), The memory means are not used by the geographic localization system for instruction or immediate operational requirements, rather they are typically used as a buffer for medium to long term storing operations such as the described above. Other use for the memory means is to temporally or permanently store information to be transmitted to an external computer or server;

command decoding means 14 comprising a command decoding unit, for decoding command information in the form of data packets (such as transmission parameter changes to be used by a transmission control means—which will be described later—or display information to the user) and petitions (such as location data requests, sensor information requests, retrieving data from memory means, sending data to memory means or changing parameters for transmission control means—which will be described later—), which are received from a remote server by the means for connecting to data channels, and sending said decoded command information to the sensor and input means data acquisition means, to a transmission priority control means and to the location resolution means. The actions which may be performed by the geographic localization system upon the reception of a command include but are not limited to getting the most recent location coordinate and send it back to the external server, get the most recent sensor data and send it back to the server, get the most recent location and sensor data and send a processed version to the server, get a number of old processed records from the memory means, send raw data from memory means to server, respond system status to server, respond estimated location accuracy to server, etc. Other important function of the command decoding means is to decompress or otherwise restore a data packet received from a remote server by the means for connecting to data channels, for the internal use of the components of the geographic localization system, since the data is received in a compressed, encoded or otherwise formatted form required by the specific data channel and has to be restored to an internal format that could be used by the components of the geographic localization system;

data compression and optimization means 15 comprising a data compression and optimization unit for receiving sensor and input means data from the sensor and input means data acquisition means; the best possible location coordinate from the location resolution means; and data from memory means (which will be describes later); and preparing and optimizing said data as data packets for transmission through a particular data channel from an internal standard protocol;

transmission control means 16, for receiving transmission parameters stored in the memory means and data packets stored in memory means and processed by the data compression and optimization means and determining the optimal transmission parameters for the transmission of the location information of the geographic localization system in accordance with preconfigured rules which may be sent wirelessly to the geographic localization system and received by the means for connecting to data channels. This is important because wireless communication technologies are optimized for specific situations and the usage of the device can also lead to different cost and operational concerns;

computer interface means 17 comprising a computer interface such as USB, RS232 for connecting to an external computer or any kind of data processing means, in order to perform activities related to, but not limited to: perform debugging, software and hardware development, diagnostic, retrieving the status, properties or operational parameters of the geographic localization system, loading ad reading log and sensor data, etc.;

audible and display means 18 such as a LCD screen, one or more LEDs, a buzzer or a speaker, for communicating messages, alarms or audible alerts to an user, for example to inform an user about the status of the geographic localization system;

timing means 19 comprising a programmable timer or a real time clock, for providing the components of the geographic localization system with a pulse to operate and for performing operations such as, but not limited to: providing a timestamp for incoming data packets received by the means for connecting to data channels, as well as the data produced by components of the geographic localization system, providing a timestamp for sensor measurements, alerting the geographic localization system of impending events, alerting the geographic localization system of sensing cycles, giving the geographic localization system a way of measuring elapsed time between received data packets, sensing intervals or other time sensitive information that can help the geographic localization system to change state. The timestamp applied to the data allows the geographic localization system to take priority, maintain information linearity and compensate for different travel times of the data being processed. Examples of data packets can be user interaction events, a request for information by an external server, a location change or status report, as well as sensor information at a particular time; and power supply means 20 such as a battery, ac, dc, solar power means, etc, for providing electric energy to all the components of the geographic localization system;

The geographic localization system of the present invention is intended to be carried by a person or implemented in a portable device in order to facilitate the localization of said person or device.

The geographic localization system of the present invention ("the system") can determine its position by using the information of one or more devices from one or more technologies from satellite accessible areas through the GPS technology 1, as well as from those not accessible by satellite through network signals from near antennas as for example Wi-Fi 3, signals from other near devices or even radio-frequency, or else from other movement measuring elements as pedometers and the combination of all of them both from the satellite accessible as from those which are not accessible by satellite, depending on its configuration and on the existence of availability in the environment.

Once that the system identifies its position, it can store said information in memory means 13 or it can send it by the data channel 2, 3, 4, 5, 6 which has been configured and which the device detects that it has found available. The device will identity those available data channels 2, 3, 4, 5, 6 which can be transmission services by cellular telephone, satellite transmission services, network services such as Wi-Fi, blue tooth, infrared, telemetry, etc.

Furthermore, the system is able to send additional information about the environment where the system is located, such as temperature, pressure, or about the presence or absence of persons or objects, as well as sound an images obtained by the sensors 9,10 and from the image and sound acquisition sensors The system can be connected to a computer by means of the computer interface means 17, in order to be configured and/or to clear out the information contained in its memory means.

The power supply means 20 of the system may be an integrated battery or it could be connected to a source of alternating current or of direct current.

The user is able to configure its preferences of use of positioning technologies as well as of the preferred data channel to be used and the frequency for both functionalities.

For example, the device could be configured in order to define its position through satellite and, if not enough satellite signal visibility is available, it could intent to search other means which allow it to define its location (by using a data channel such as Bluetooth, WIFI, etc.), and the user could prioritize the location technologies. Besides, the devise can be configured so as to search its location each N seconds.

Furthermore, the system can be configured so as to store or not the location information in the memory means 13 for a determined time period or until such information be manually synchronized with an external computer and erased or until such memory be exhausted and if this could happen, that it could be erasing the older registers so as to keep the latest or it could be blocked and not allowed to record more information, keeping the oldest registers.

Besides, the system can be configured with the priority in which it is intended to transmit the information to a server and the frequency with which it is intended to send the location information in accordance with each transmission technology corresponding to the data channel. Furthermore, it can be configured so that, if the transmission technology with the maximum priority is found, it transmit each predetermined number of seconds, but, if it is not found, then it will transmit with the available technology that was previously configured with lesser priority.

Additionally, the system can be configured with the frequency with which it intends to be located (the frequency of the data channels 2, 3, 4, 5, 6 and positioning means 1) and the frequency with which it looks for the available transmission means. For example, it can be configured that, if the system can be located by satellite, it search its position each predetermined number of seconds, and it can be transmitted by telemetry which, for example could be the highest priority, then the system may transmit its location each predetermined number of seconds, but, if it does not found telemetry and founds GPS services by cellular network (which for example can be configured to the have lowermost priority) then the system may transmit its location each predetermined number of seconds and it can search each predetermined number of seconds if other transmission methods with more priority are available.

Each transmission means (data channels 2, 3, 4, 5, 6) can be configured both for the frequency that they transmit, as well as its priority and the frequency in which other transmission means with highest priority have to be searched. The same can be applied for the positioning technologies.

Now the geographic localization method of the present invention will be described in accordance with a preferred modality comprising:

obtaining communication information from at least one available data channel selected from the group consisting of, but not limited to: Bluetooth networks, WiFi networks, transceiver means, cellular networks, satellite networks, and from available positioning means selected, but no limited to GPS;

obtaining available location information from at least one of said available data channel, from said available positioning means and processing said available location information together with the inferred position information and obtaining the best location information. The processing of said available location information together with the inferred position may be carried out by data processing means processing a deduction algorithm;

sending said best location information by means of transmission means;

Optionally, it can be obtained environment information selected from but not limited to temperature and pressure, images, sounds of the current location, presence information about the presence or absence of persons in the current location and information about the detection of movement in the current location and send said information together with the best location information by means of said transmission means.

and from available positioning means and inferring a location;

obtaining available location information from at least one available data channel, from available positioning means and processing said available location information together with the inferred position information and obtaining the best location information.

Finally it must be understood that the geographic localization system, of the present invention, is not limited exclusively to the embodiments above described and illustrated and that the persons having ordinary skill in the art can, with the teaching provided by the invention, to make modifications to the geographic localization system of present invention, which will clearly be within of the true inventive concept and of the scope of the invention which is claimed in the following claims.

We claim:
1. A geographic localization system comprising:
   positioning means for calculating the approximate position of a geographic localization device;
   means for connecting to at least one data channel;
   location inference means receiving communication information about at least one data channel from the means for connecting to at least one data channel and inferring the location of the geographic localization system;

location resolution means, i) receiving location information from at least one of the following sources: from the location inference means, from the positioning means, and from the at least one data channel. and ii) obtaining the best location information from said received location information;

transmission control means for controlling the transmission of data to and from the geographic localization system by means of the at least one data channel; and power supply means, wherein the means for connecting to the at least one data channel provides at least:

a Bluetooth network connection, a WiFi network connection, transceiver means comprising a Zigbee, ASK/OOK, or proprietary transceiver module, means for connecting to cellular networks comprising a cellular data module, said means for connecting to a cellular network capable of calculating an approximate location coordinate based on proprietary algorithms using a data signal and timing and other characteristics intrinsic to each particular network which are processed in the cellular data module to be available to the geographic positioning device, and means for connecting to a satellite or to satellite networks comprising a satellite up/down link for sending and receiving information to and from a satellite or network of satellites to allow concentration of information on a main server as well as propagating information from a server connected to the geographic localization system to other devices around the world.

2. A geographic localization system as claimed in claim 1, wherein the positioning means comprising a global positioning system, receiving information from dedicated satellites and calculating the approximate location; calculating speed, altitude and bearing in the current location and providing timing information.

3. A geographic localization system as claimed in claim 1, wherein the location inference means comprising a location inference unit, receiving information from at least one data channel, about communication links, and inferring an approximate location of the geographic localization device by using several parameters of the information about said communication links, and wherein the approximate location is calculated by using said parameters in order to locate a nearest base communication station and if the parameters of said communication with said nearest communication base station are within a predetermined range, the location inference means assumes that the geographic localization system is within a position.

4. A geographic localization system as claimed in claim 1, wherein the location inference means including means for increasing the accuracy of the location information, comprising a deduction algorithm processed by the location inference means.

5. A geographic localization system as claimed in claim 1, wherein the location resolution means additionally interpolate or include hysteresis by merging all the different location information.

6. A geographic localization system as claimed in claim 1, further including memory means for storing information related to the geographic localization system.

7. A geographic localization system as claimed in claim 6, wherein the memory means, comprises an internal or removable memory for storing information including data from sensors for acquiring data from the environment of the geographic localization system, input means data from input means, approximate location data from the location inference means, location information from the location resolution means, transmission parameters used by transmission control means, timing information produced by timing means which provides the components of the geographic localization system with a pulse to operate, for later processing by the components of the geographic localization system.

8. A geographic localization system as claimed in claim 7, wherein the memory means, temporally or permanently stores information to be transmitted to an external computer or an external server.

9. A geographic localization system as claimed in claim 1, wherein the transmission control means, receive transmission parameters stored in memory means and data packets stored in memory means and determine the optimal transmission parameters for the transmission of the location information of the geographic localization system in accordance with preconfigured rules which may be sent wirelessly to the geographic localization system and received by the means for connecting to data channels.

10. A geographic localization system as claimed in claim 1, further comprising sensors for acquiring data from the environment of the geographic localization system.

11. A geographic localization system as claimed in claim 10 further including input means for allowing a user to interact with the geographic localization system.

12. A geographic localization system as claimed in claim 1, further including a command decoder that decodes command information and petitions which are received from a remote server by the means for connecting to data channels, and sends decoded command information to the components of the geographic localization system in order to initiate at least one activity.

13. A geographic localization system as claimed in claim 12, wherein the at least one activity is selected from the group comprising at least:

getting the most recent location coordinate and send it back to an external server, get data from sensors for acquiring data from the environment of the geographic localization system and send it back to the external server, get the most recent location and data from sensors and send a processed version to the external server, get a number of old processed records from memory means, send raw data from memory means to the external server, send system status to the external server, and respond estimated location accuracy to the external server.

14. A geographic localization system as claimed in claim 12, wherein the command decoding means decompress a data packet received from an external server by the means for connecting to data channels, for the internal use of the components of the geographic localization system, to a format that could be used by the components of the geographic localization system.

15. A geographic localization system as claimed in claim 1, further including computer interface means for connecting to an external computer.

16. A geographic localization system as claimed in claim 1, further including audible and display means for communicating messages, alarms or audible alerts to a user.

17. A geographic localization system as claimed in claim 1, further including timing means for providing the components of the geographic localization system with a pulse to operate.

18. A geographic localization system as claimed in claim 1, further including timing means for performing operations including:

providing a timestamp for incoming data packets received by the means for connecting to data channels, as well as the data produced by components of the geographic localization system; and providing a timestamp for measurements of sensors for acquiring data from the environment of the geographic localization system, alerting the geographic localization system of impending events, alerting the geographic localization system of sensing cycles, giving the geographic localization system a way of measuring elapsed time between received data packets, sensing intervals or other time sensitive information that can help the geographic localization system to change state.

* * * * *